United States Patent
Kalyanasundaram et al.

(10) Patent No.: US 7,474,465 B2
(45) Date of Patent: Jan. 6, 2009

(54) ELECTRICALLY-RESPONSIVE LENTICULAR DISPLAY APPARATUS AND METHOD

(75) Inventors: Krishna Kalyanasundaram, Elmhurst, IL (US); Daniel R. Gamota, Palatine, IL (US); Krishna D. Jonnalagadda, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/273,702

(22) Filed: Nov. 14, 2005

(65) Prior Publication Data

US 2007/0109655 A1    May 17, 2007

(51) Int. Cl.
G02B 27/10    (2006.01)
(52) U.S. Cl. ..................................... 359/619
(58) Field of Classification Search .......... 359/618–626
See application file for complete search history.

(56) References Cited

U.S. PATENT DOCUMENTS

| | | | |
|---|---|---|---|
| 4,703,219 A * | 10/1987 | Mesquida | 313/111 |
| 5,493,427 A | 2/1996 | Nomura et al. | |
| 5,598,280 A | 1/1997 | Nishio et al. | |
| 5,737,087 A * | 4/1998 | Morton et al. | 358/296 |
| 6,023,277 A | 2/2000 | Osaka et al. | |
| 6,532,690 B1 * | 3/2003 | Vachette et al. | 40/454 |
| 6,833,960 B1 * | 12/2004 | Scarbrough et al. | 359/619 |
| 2002/0075566 A1 * | 6/2002 | Tutt et al. | 359/619 |
| 2002/0085287 A1 * | 7/2002 | Egawa | 359/619 |
| 2003/0016444 A1 * | 1/2003 | Brown et al. | 359/462 |
| 2005/0243161 A1 * | 11/2005 | Wong et al. | 347/238 |
| 2006/0125387 A1 * | 6/2006 | Adachi et al. | 313/506 |

OTHER PUBLICATIONS

International Search Report for PCT/US2006/060449, Apr. 25, 2008, 2 pgs.

* cited by examiner

*Primary Examiner*—Alicia M Harrington

(57) ABSTRACT

An integrated electrically-responsive lenticular display apparatus (300) includes a lenticular lens (301) integrally combined with at least one electrically-responsive light-emissive pattern (202). The electrically-responsive light-emissive pattern (202) is a printed electrically-responsive light-emissive pattern. The printed pattern may be printed directly onto the lenticular lens (301) or onto a substrate (502), which then attaches to the lenticular lens (301). The electrically-responsive light-emissive pattern (202) can be interleaved with another pattern (203). The other pattern (203) may include another electrically-responsive light-emissive pattern or a non-electrically-responsive light-emissive pattern.

13 Claims, 2 Drawing Sheets

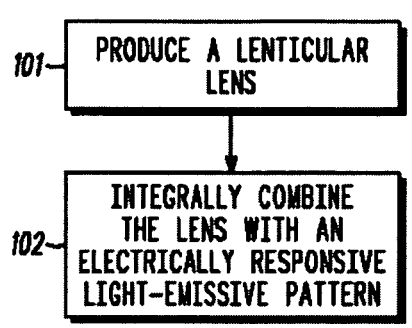
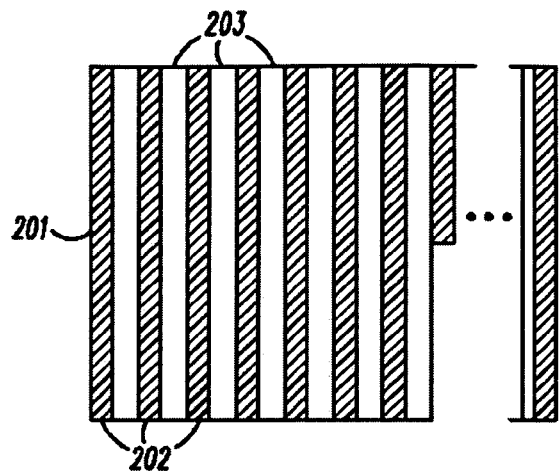
FIG. 1
FIG. 2
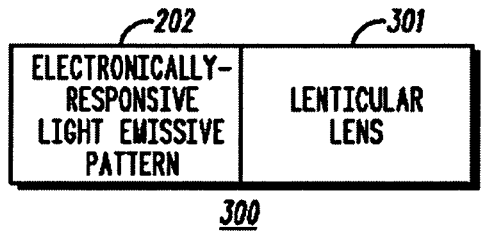
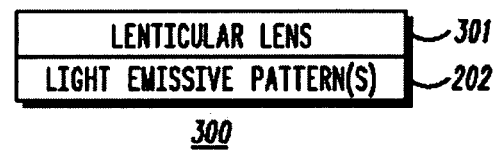
FIG. 3
FIG. 4
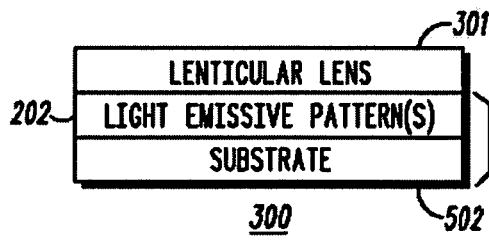
FIG. 5
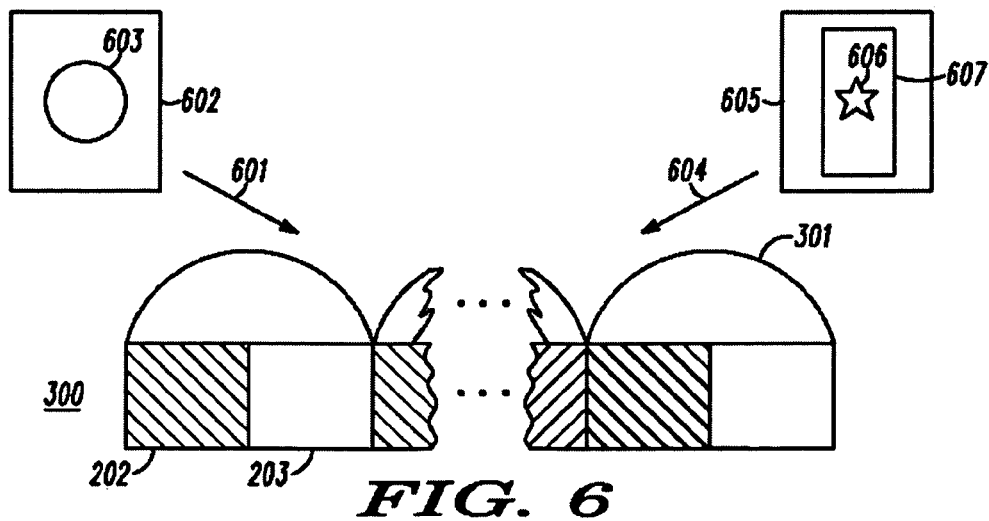
FIG. 6

ELECTRICALLY-RESPONSIVE LENTICULAR DISPLAY APPARATUS AND METHOD

TECHNICAL FIELD

This invention relates generally to a lenticular display apparatus for displaying one or more images.

BACKGROUND

A typical lenticular display apparatus includes a lenticular lens and a lenticular image. A typical lenticular lens includes an array of lenses integrally combined. Generally, this array includes a plurality of elongated convex lenses configured in rows or columns adjacent and parallel to each other. The lenticular image includes at least two interleaved or interlaced images, which may also be referred to as spatially multiplexed images. This lenticular image is typically disposed either directly on the backside of the lenticular lens or on a substrate attached to the backside of the lens. So configured, the array of lenses that comprise the lenticular lens project different perceivable images as a viewer's angle of perception changes relative thereto.

Additionally, it is known to combine such lenticular display apparatuses with an illumination source for backlighting. Backlighting illuminates the display when used outside of a well-lit environment. Further yet, it is known to provide such lenticular display apparatuses with an image comprising fluorescent material. Fluorescent material such as fluorescent ink includes phosphors that glow when exposed to ultraviolet light.

While the above-described lenticular display apparatuses have had some level of operational success, their applications are limited. For example, while backlighting enables a lenticular display to be viewed in a dark environment, it typically illuminates the entire lenticular image. Backlighting lacks the ability to sharply and discretely illuminate one of the interleaved images and not the other(s). Additionally, backlighting sometimes lacks the ability to sharply and discretely illuminate a portion of one or more of the interleaved images. Furthermore, while fluorescent material may enhance the visual appeal of lenticular displays, fluorescent material requires the presence of ultraviolet light to charge the phosphors therein. Providing ultraviolet light requires environmental control, which is not always practical.

BRIEF DESCRIPTION OF THE DRAWINGS

The above problems are at least partially addressed through the provision of an electrically-responsive lenticular apparatus and method according to the principles of the present invention and described in the following detailed description, particularly when studied in conjunction with the drawings, wherein:

FIG. 1 comprises a flowchart of a method of manufacturing an integrated electrically-responsive lenticular display apparatus as configured in accordance with various embodiments of the present invention;

FIG. 2 comprises a block diagram of an integrated electrically-responsive lenticular display apparatus as configured in accordance with various embodiments of the present invention;

FIG. 3 comprises a schematic plan view of a lenticular image of an integrated electrically-responsive lenticular display apparatus as configured in accordance with various embodiments of the present invention;

FIG. 4 comprises a schematic cross-sectional view of an integrated electrically-responsive lenticular display apparatus as configured in accordance with various embodiments of the present invention;

FIG. 5 comprises a schematic cross-sectional view of an integrated electrically-responsive lenticular display apparatus as configured in accordance with various embodiments of the present invention;

FIG. 6 comprises a fragmented cross-sectional view of an integrated electrically-responsive lenticular display apparatus as configured in accordance with various embodiments of the present invention;

Figure 7:
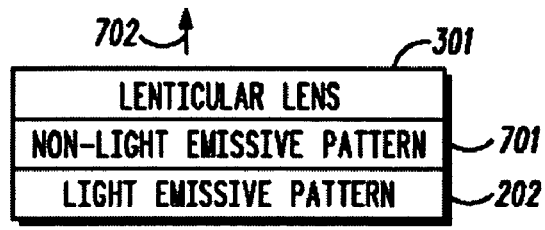
FIG. 7 comprises a schematic cross-sectional view of an integrated electrically-responsive lenticular display apparatus as configured in accordance with various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common, but well-understood, elements that are useful or necessary in a commercially feasible embodiment are often not depicted in order to facilitate a less obstructed view of these various embodiments of the present invention. It will further be appreciated that certain actions and/or sequences of occurrences may be described or depicted in a particular order while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an integrated electrically-responsive lenticular display apparatus includes a lenticular lens integrally combined with at least one pattern. At least a portion of the pattern includes an electrically-responsive light-emissive pattern. The electrically-responsive light-emissive pattern can comprise a portion of an image, an entire image, or multiple images viewable through the lenticular lens. In one aspect of the present invention, the electrically-responsive light-emissive pattern is a printed electrically-responsive light-emissive pattern. The printed pattern may be printed directly onto the lenticular lens or onto a substrate attached to the lenticular lens. In one embodiment, the electrically-responsive light-emissive pattern can be interleaved with another pattern. The other pattern may include another electrically-responsive light-emissive pattern or a non-electrically-responsive light-emissive pattern. In yet another embodiment, the electrically-responsive light-emissive pattern is layered with a non-electrically-responsive light-emissive pattern to provide backlighting to a discrete segment or the entire image.

So configured, relatively inexpensive printing processes and materials can serve to produce selectively energizable lenticular displays in any lighted or non-lighted environment. The printed electrically-responsive light-emissive material enables one to create sharp, discrete, and finite illuminated patterns. These patterns may constitute an entire image, multiple images, portions of a single image, and/or other informational content displayed through the lenticular lens. Additionally, such illuminated patterns may complement or contrast with non-illuminated patterns to create an image, multiple images, portions of a single image, and/or other informational content. As these teachings provide only a relatively modest expense to effect, such integrated electrically-responsive lenticular display apparatuses can be implemented into smart advertising materials, radio controlled authentication labels, posters, retail packaging, novelty items, and/or any other application as may be presently known or hereafter developed.

These and other benefits may become clearer upon making a thorough review and study of the following detailed description. Referring now to the drawings and particularly, to FIG. 1, a process 100 for manufacturing an integrated electrically-responsive lenticular display apparatus first includes providing 101 a lenticular lens. The lenticular lens can be one of any variety of lenticular lenses generally known within the art and is not limited to the lenticular lens specifically depicted in the drawings or hereinafter described in connection with the following embodiments.

Subsequent to providing the lenticular lens, the process 100 includes integrally combining 102 the lenticular lens with an electrically-responsive light-emissive pattern. With reference to FIG. 2, it should be appreciated that integrally combining 102 the electrically-responsive light-emissive pattern 202 may include interleaving the electrically-responsive light-emissive pattern 202 with a second pattern 203 to form a pair of interleaved images 201. The second pattern 203 may include another electrically-responsive light-emissive pattern or a non-electrically-responsive light-emissive pattern. Each of the pair of images 201 may include essentially any design pattern such as a symbol, an alphanumeric character, a logo, an artistic rendering, a photograph, a pictograph, a bar code, a label, an authentic seal, or any combination of visually recognizable or non-recognizable features. Furthermore, each of the pair of images 201 may define separate unrelated images or a pair of related images portraying, for example, a sequence of events. Further yet, it should be appreciated that while a pair of images 201 have been described herein, any number of interleaved images may be implemented according to the principles of the lenticular display apparatus 300. Additionally, it should be appreciated that while FIG. 2 schematically depicts the pair of images 201 as directly interleaved with each other, an alternative embodiment may include gaps between the interleaved pair of images 201. In yet another embodiment, the gaps may include a buffer material, which itself may form yet another interleaved image.

FIG. 3 depicts a block diagram of an illustrative integrated lenticular display apparatus 300 including an electrically-responsive light-emissive pattern 202 and a lenticular lens 301. The electrically-responsive light-emissive pattern 202 projects through the lenticular lens 301, as is depicted by the arrow denoted by reference numeral 303. It should be appreciated that such patterns are generally well known within the art and are intended to include essentially any and all design patterns. For example, it is contemplated that such a pattern may include any combination of mixed content including both artistic renderings and symbolic informational content such as written text. It should also be appreciated that a plurality of such patterns can be provided as desired for any specific application.

Additionally, it should be appreciated that, in one embodiment, the electrically-responsive light-emissive pattern 202 includes a functional ink comprising at least one energy emissive material. The energy emissive material is preferably one that is energizable by application of an electric field from a power source such as a battery, a photovoltaic device, a fuel cell, an alternating current-based power source, or other device capable of serving as a source of power. Useful examples of functional inks include, but are not limited to, functional inks including phosphors or organic light emitting diode or conducting, resistive, insulative, or semi-conductor material. In general, any suitable material for placement as an ink and that is capable of selectively emitting light when energized by an electric field is intended to be within the scope of the present invention.

Furthermore, it is specifically contemplated that integrally combining 102 an electrically-responsive light-emissive pattern 202 with the lenticular lens 301 includes printing the electrically-responsive light-emissive pattern 202. It should be appreciated that "printing" as used herein includes but is not limited to any contact or non-contact type printing process. Examples of contact printing processes include, but are not limited to, screen printing processes, flexography printing processes, gravure printing processes, micro-contact printing processes, and offset printing processes. Examples of non-contact printing processes include, but are not limited to, ink dispensing printing processes, ink jet printing processes, and curtain coating printing processes. Additionally, it should be appreciated that printing the electrically-responsive light-emissive pattern 202 may also include printing dielectric and conductive layers in conjunction with a functional ink according to the particular material and technology employed for a given embodiment.

FIG. 4 schematically depicts one embodiment of a lenticular display apparatus 300 including the lenticular lens 301 having the electrically-responsive light-emissive pattern 202 printed directly on a backside thereof. FIG. 5 schematically depicts another embodiment of a lenticular display apparatus 300 including a lenticular lens 301 and an image component 501. The image component 501 includes a substrate 502 having the electrically-responsive light-emissive pattern 202 printed thereon. The image component 501 is attached to the backside of the lenticular lens 301 to constitute the lenticular display apparatus 300.

It should be appreciated that the above-mentioned substrate 502 of the image component 501 may comprise any suitable printing medium including, but not limited to, a paper substrate, a cardboard substrate, a polymer-based substrate, a glass substrate, a woven-cloth substrate, a metal substrate, or any other suitable material. Therefore, the construction of the lenticular display apparatus 300 so configured further includes attaching the image component 501 to the backside of the lenticular lens 301. In one embodiment, attaching the image component 501 to the lenticular lens includes adhering the image component 501 to the backside of the lenticular lens 301 with a suitable adhesive. However, it should be appreciated that other suitable fixing means are intended to be within the scope of the present invention according to the specific needs and requirements of a given application.

FIG. 6 depicts a fragmented cross-sectional view of a lenticular display apparatus 300 in accordance with the principles of the present invention. According to the process described above, the lenticular display apparatus 300 includes a lenticular lens 301 having an electrically-responsive light-emissive pattern 202 and a non-electrically-responsive light-emissive pattern 203 printed on a backside thereof. The electrically-responsive light-emissive pattern 202 and the non-electrically-responsive light-emissive pattern 203 define first and second interleaved images 602, 605. The non-electrically-responsive light-emissive pattern 203 combines with the lenticular lens 301 to form the first image 602. The electrically-responsive light-emissive pattern 202 combines with the lenticular lens 301 to form the second image 605. It should be appreciated that the non-electrically-responsive light-emissive pattern 203 may comprise any material suitable for an image such as ink, paint, dye, or other material.

Therefore, when a viewer views the lenticular display apparatus 300 from a first angular position, which is identified by an arrow denoted by reference numeral 601, the viewer sees the first image 602. The first image 602 in this simple example includes a circle 603 consisting entirely of the non-electrically-responsive light-emissive pattern 203. Alternatively, when a viewer views the lenticular display apparatus 300 from a second angular position, which is identified by an arrow denoted by reference numeral 604, the viewer sees the second image 605. The second image 605 is different than the first image 602 in this example. The second image 605 includes, for purposes of this example, a star 606 and a box 607. In FIG. 6, both the star 606 and the box 607 include the electrically-responsive light-emissive pattern 202. It should be appreciated, however, that in an alternative embodiment, one of either the star 606 or the box 607 may include non-electrically-responsive light-emissive material to contrast with the other, which includes electrically-responsive light emissive material.

As stated above, it should be appreciated that while FIG. 6 depicts a lenticular display apparatus 300 including only two interleaved images 602, 605, the lenticular display apparatus 300 may include any number of interleaved or non-interleaved images. For example, the lenticular device 300 may include three interleaved images. So configured, a user would see a third image projected from the lenticular lens 301 when viewing the lenticular lens 301 from an angle different from those identified by the above-noted arrows 601, 604 in FIG. 6. Additionally, it should be appreciated that while FIG. 6 includes two images 602, 605 that are entirely independent, distinct, and unrelated, the lenticular display apparatus 300 may include a plurality of related images. For example, the lenticular display apparatus 300 may include a plurality of images such that when a viewer's angular perspective of the lenticular display apparatus 300 changes relative thereto, the lenticular display apparatus 300 projects a sequence of images illustrating motion. The motion may represent, for example, an airplane flying through the sky or a baseball player swinging a baseball bat.

With reference now to the schematic view depicted in FIG. 7, another embodiment of the lenticular display device 300 includes layering the electrically-responsive light-emissive pattern 202 with a second pattern 701. In one example the second pattern 701 includes a non-electrically-responsive light-emissive pattern. So configured, any portion of the electrically-responsive light-emissive pattern 202 situated directly below any portion of the non-electrically-responsive light-emissive pattern 701 is not directly viewable through the lenticular lens 301. Accordingly, the electrically-responsive light-emissive pattern 202 serves as a backlight to project the non-electrically-responsive light-emissive pattern 701 through the lenticular lens, as indicated by an arrow denoted by reference numeral 702 in FIG. 7. Unlike conventional backlighting, the backlighting provided by the lenticular display apparatus 300 in FIG. 7 can provide sharp, discrete, and definitive backlighting to the entire non-electrically-responsive light-emissive pattern 701 or selected portions thereof depending on the specific application.

Additionally, it should be appreciated that the lenticular display apparatus 300 configured to provide backlighting, as schematically depicted in FIG. 7, may also be combined with a traditional backlight. The traditional backlight may include any type of traditional illumination source positioned behind the electrically-responsive light-emissive pattern 202. The traditional backlight would project the entire lenticular image(s) or a portion of the image(s) through the lenticular lens 301. Similarly, a traditional backlight could be combined with the other embodiments described herein as well. Furthermore, it should be appreciated that while the embodiment schematically depicted in FIG. 7 has been described in the context of providing backlighting to the lenticular display apparatus 300, it may alternatively not provide backlighting. Rather, similar to the embodiments described above in reference to FIGS. 4 and 5, the lenticular display apparatus 300 of FIG. 7 may simply provide a lenticular image comprising an electrically-responsive light-emissive pattern 202 and a non-electrically-responsive light-emissive pattern 701. The difference between the embodiment schematically depicted in FIG. 7 and those schematically depicted in FIGS. 4 and 5 is that the two patterns 202, 701 are provided on different layers. Further yet, it should be appreciated that the lenticular display apparatus 300 schematically depicted in FIG. 7 may alternatively be combined with a substrate, similar to that schematically depicted in FIG. 5.

Figure 8:
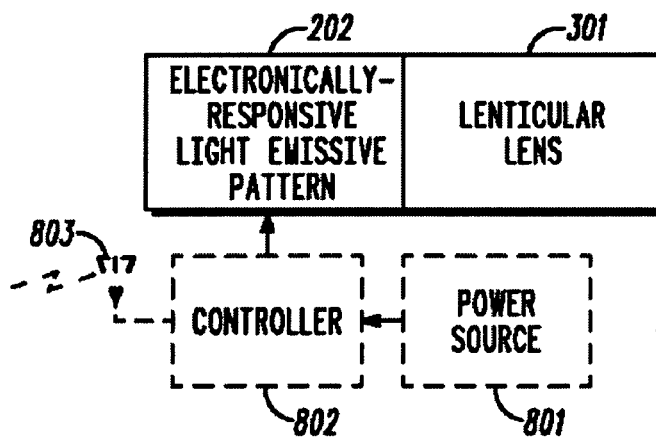
FIG. 8 comprises a block diagram of an integrated electrically-responsive lenticular display apparatus as configured in accordance with various embodiments of the present invention.
Figure 9:
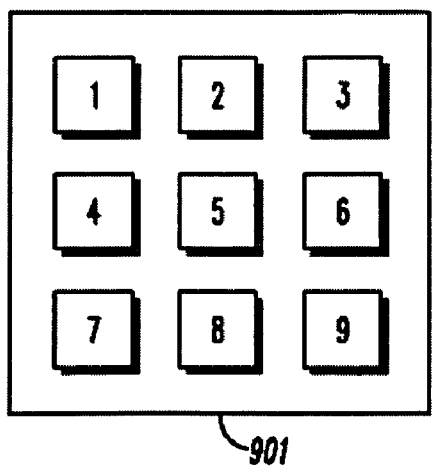
FIG. 9 comprises a plan view of a user-manipulable interface of an integrated electrically-responsive lenticular display apparatus as configured in accordance with various embodiments of the present invention.

With reference now to FIGS. 8 and 9, another embodiment of the lenticular display apparatus 300 includes a lenticular lens 301, an electrically-responsive light-emissive pattern 202, a power source 801, a controller 802, and a wireless interface 803. Identical to that described above, the electrically-responsive light-emissive pattern 202 is integrally combined with the lenticular lens 301. The power source 801 and controller 802 connect in series with the electrically-responsive light-emissive pattern 202 to provide power and control thereto. The wireless interface 803 receives and/or transmits operational information in the form of signals to and from the controller 802.

In one embodiment, the power source 801 is separate from and electrically coupled to the electrically-responsive light-emissive pattern 202. The power source 801 may include a battery, a photovoltaic device, a fuel cell, an alternating current-based power source, or any other device coupled to provide a selectively energizable electric field to the electrically-responsive light-emissive pattern 202. In another embodiment, the power source 801 is integrally combined with the electrically-responsive light-emissive pattern 202. So configured, the power source 801 may be printed directly onto the lenticular lens 301 or on a substrate 202 as part of the image component 502 depicted schematically in FIG. 5. The printed power source 801 may be printed on a layer behind the electrically-responsive light-emissive pattern 202 or on a portion of the lenticular display apparatus 300 that is not readily viewable through the lenticular lens 301. Such printed power sources are well known in the art and require no further elaboration here.

In one embodiment, the controller 802 is separate from and electrically coupled to the electrically-responsive light-emissive pattern 202. The controller 802 may include an input, an output, a processor, a memory, or any other component as required for a specific application. The controller 802 provides control and/or processing in association with selective energization of the electrically-responsive light-emissive pattern 202. In another embodiment, the controller 802 includes a controller 802 integrally combined with the electrically-responsive light-emissive pattern 202. So configured, the controller 802 may be printed directly onto the lenticular lens 301 or on a substrate 502 as part of the image component 501 depicted schematically in FIG. 5. Similar to the integrated power source 801 described above, the integrated controller 802 may be printed on a layer behind the electrically-responsive light-emissive pattern 202 or on a portion of the lenticular display apparatus 300 that is not readily viewable through the lenticular lens 301.

Additionally, the controller 802 may include a user-manipulable interface 901, as depicted in FIG. 9. In one embodiment, the user-manipulable interface 901 may comprise, for example, a keypad (or, more particularly, a contact-sensitive depiction of a keypad). The user manipulable interface 901 may enable a user to control the selective energization or de-energization of the electrically-responsive light-emissive pattern 202. For example, in one embodiment, the lenticular display apparatus 300 may require a user to input a code such as a security code for the controller 802 to enable the power source 801 to energize the electrically-responsive light-emissive patter 202. In another embodiment, the lenticular display apparatus 300 includes a dynamic display such that a user entering a user's code into the user-manipulable interface 901 changes the frequency or duty cycle at which the dynamic display operates.

Further yet, the wireless interface 803 may include a wireless radio frequency identifier (RFID) device. This would enable, for example, selective energization of the electrically-responsive light-emissive pattern 202 from a wireless transmission device. For example, in one embodiment, a product such as an article of clothing may have a lenticular display apparatus 300 attached thereto. When a salesperson scans the bar code attached to the article to obtain pricing information, the wireless RFID device receives a signal instructing the controller 802 to allow the power source 801 to energize the electrically-responsive light-emissive pattern 202. Such an application could be useful, for example, in determining the origin and/or authenticity of goods and to help identify counterfeit goods.

Furthermore, it should be appreciated that while the above-described embodiment includes both a power source 801 and a controller 802, an alternative embodiment may include only a power source 801. In such a case, it would be foreseeable to provide a power source 801 having a switching mechanism for selectively energizing the electrically-responsive light-emissive pattern 202. Additionally, it should be appreciated that while the above-described embodiment includes a wireless interface 803, an alternative embodiment may include a wired interface. A yet further alternative embodiment may not include an interface at all. So configured, the controller 802 or the power source 801 may include the processing capabilities to independently operate the lenticular display apparatus 300 according to a pre-programmed algorithm or some other fixed or dynamic process.

Further yet, while the electrically-responsive light emissive and non-electrically-responsive light emissive patterns have not been described herein as including any particular color or combination of colors, it should be appreciated that either or both of these patterns in any of the above-described embodiments may include one or more colors for added aesthetic or functional appeal.

Therefore, it should be appreciated that these teachings provide a cost-effective, highly flexible, and attractive lenticular display. Such a lenticular display apparatus 300 provides for the sharp and discrete illuminated display of multiple interleaved images and/or specific patterns within a single image. Hence, it should be appreciated that such a device provides an exciting and effective display for an advertising campaign, an anti-counterfeiting measure, a novelty device, or any other imaginable commercial or non-commercial article.

Additionally, those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   a lenticular lens comprising a plurality of substantially parallel, semi-cylindrical lenses;
   a first electrically-responsive light-emissive pattern that is integrally combined with a lenticular lens and that comprises a first image viewable through the lenticular lens from a first viewer angular position;
   at least one additional pattern comprising a second image, not the same as the first image, viewable through the lenticular lens from an additional viewer angular position that is not the same as the first viewer angular position; wherein:
   the at least one additional pattern comprises at least one non-light emissive pattern integrally combined with the lenticular lens, and wherein the at least one non-light emissive pattern is interleaved with the first electrically-responsive light emissive pattern; and
   an element comprising at least one of:
   and electrically-responsive light-emissive pattern controller operably coupled to the first electrically-responsive light emissive pattern; and
   a power source operably coupled to the first electrically-responsive light-emissive pattern.

2. The apparatus of claim 1 wherein the first electrically-responsive light-emissive pattern comprises a functional ink.

3. The apparatus of claim 1 further comprising:
   the at least one additional pattern comprising at least one additional light-emissive pattern integrally combined with the lenticular lens, wherein the at least one additional light-emissive pattern is interleaved with the first electrically-responsive light-emissive pattern.

4. The apparatus of claim 1 wherein the element is disposed non-integrally with respect to the lenticular lens.

5. The apparatus of claim 1 wherein the element is disposed integrally with respect to the lenticular lens.

6. The apparatus of claim 1 wherein the electrically-responsive light-emissive pattern controller further comprises a user-manipulable interface.

7. The apparatus of claim 1 wherein the electrically-responsive light-emissive pattern controller further comprises a wireless interface.

8. An apparatus comprising:
   A lenticular lens comprising a plurality of substantially parallel, semi-cylindrical lenses;
   A first electrically-responsive light emissive pattern that is integrally combined with a lenticular lens comprises first image that, when illuminated, is viewable through the lenticular lens from a first viewer angular position, and wherein the first electrically-responsive light-emissive pattern is not directly viewable through the lenticular lens when not illuminated;
   at least one non-light-emissive pattern, viewable from the same first viewer angular position as the first electrically-responsive light-emissive pattern, integrally combined with the lenticular lens, wherein the first electrically-responsive light-emissive pattern provides backlighting for the at least one non-light-emissive pattern;

at least one additional pattern comprising a second image, not the same as the first image, viewable through the lenticular lens from an additional viewer angular position that is not the same as the first viewer angular position; and:

an element comprising at least one of:

an electrically-responsive light-emissive pattern controller operably coupled to the first electrically-responsive light-emissive pattern; and a power source operably coupled to the first electrically-responsive light-emissive pattern.

9. A method comprising:

providing a lenticular lens comprising a plurality of substantially parallel, semi-cylindrical lenses;

integrally combining a first electrically-responsive light-emissive pattern, comprising a first image viewable through the lenticular lens from a first viewer angular, position, with the lenticular lens;

providing a non-electrically-responsive light-emissive pattern viewable from the same viewer angular position as the first electrically-responsive light-emissive pattern and backlighting the non-electrically-responsive light-emissive pattern using the first electrically-responsive light-emissive pattern;

integrally combining at least one additional pattern, comprising a second image, not the same as the first image, viewable through the lenticular lens from an additional viewer angular position that is not the same as the first viewer angular position, with the lenticular lens.

10. The method of claim 9 wherein integrally combining the first electrically-responsive light-emissive pattern with the lenticular lens comprises printing the first electrically-responsive light-emissive pattern.

11. The method of claim 10 wherein printing the electrically-responsive light-emissive pattern further comprises printing the electrically-responsive light-emissive pattern on at least one of:

the lenticular lens;

a substrate that is combined with the lenticular lens.

12. The method of claim 9 wherein the additional pattern comprising a second image, not the same as the first image, comprises at least one of:

a non-electrically-responsive light-emissive pattern;

an additional electrically-responsive light-emissive pattern.

13. The method of claim 12 wherein combining comprises at least one of:

interleaving;

layering.

* * * * *